ant/sub>ed June 26, 1951

UNITED STATES PATENT OFFICE 2,558,701

LIGHT-STABILIZED COMPOSITIONS OF VINYLIDENE CHLORIDE OR VINYL CHLORIDE

Gerald M. Corbett and Nelson W. Abernethy, Midland, Mich., assignors to The Dow Chemical Company, Midland, Mich., a corporation of Delaware No Drawing. Application March 29, 1950, Serial No. 152,756

7 Claims. (Cl. 260—45.8)

This invention relates to compositions of matter comprising polymeric bodies in which either vinylidene chloride or vinyl chloride is present in substantial amount, and modifying agents therefor, which agents improve the stability of the polymers to light.

The polymer of vinylidene chloride, that of vinyl chloride, and many copolymers and plasticized compositions thereof are now well-known in the art. Most of these polymers, copolymers, and compositions thereof can be molded or extruded to form useful, shaped articles. They commonly suffer from the disadvantage of undergoing decomposition when exposed for prolonged periods to the effects of light.

The plastic properties of the above-mentioned polymers and copolymers may be modified considerably by adding certain plasticizing agents either to the polymeric material or to the monomer or mixture of monomers from which it is prepared. Most of the plasticizers are apparently incapable of preventing or of substantially reducing the tendency of these polymers to decompose or to darken when exposed for prolonged periods to the effects of light. These undesirable effects are particularly noticeable when dealing with articles having a thin section, such as is found in films or filaments. Some addition agents have been found to stabilize the polymer and copolymers somewhat against the effects of light. In a few instances the stabilizing agent has, as well, some plasticizing properties. While various protective agents have been proposed, one is still desired which has good plasticizing properties and provides adequate stabilization against the effects of light.

It is accordingly among the objects of the present invention to provide a vinylidene chloride or a vinyl chloride polymer composition containing a light stabilizer which will afford improved protection. A related object is to provide such a composition which is stable both to the ultra-violet light from artificial sources and that contained in direct sunlight, so that the composition may be stable toward any common type of light to which it may be subjected. A further object is to provide a stabilized composition as aforesaid which can be heated to temperatures sufficiently above the softening point of the composition so that the polymer may be readily worked while in a plastic state, without decomposition.

It has now been found that the foregoing and related objects may readily be attained by incorporating in the polymer or copolymer an ester of 7-oxabicyclo-(2,2,1)-5-heptene 2,3-dicarboxylic anhydride. Such ester has the structural formula:

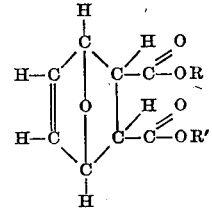

wherein one of the members R and R' is a hydrocarbon radical and the other is independently selected from the class consisting of hydrogen and such radicals. The most effective esters of this class appear to be the alkyl esters and particularly those wherein the alkyl radical contains from 1 to 12 carbon atoms. The higher alkyl esters are also somewhat effective and provide improved compositions as do aryl and aralkyl esters of 7-oxabicyclo-(2,2,1)-5-heptene 2,3-dicarboxylic anhydride. Examples of the preferred compounds for use in the herein claimed compositions are the n-propyl, isobutyl, and nonyl diesters of 7-oxabicyclo-(2,2,1)-5-heptene 2,3-dicarboxylic anhydride. Among the other esters which may be employed for the present purpose are the methyl, ethyl, isopropyl, butyl, pentyl, hexyl, heptyl, octyl, decyl, undecyl and dodecyl diesters of said acid anhydride, and mixed esters containing two of these groups.

The amount of the preferred ester to be employed may vary with the type of copolymer to which it is added and with the conditions against which it is desired to protect the polymeric product. Amounts varying from about 0.5 to about 10 per cent of the weight of polymer to be modified and protected, are employed. Larger amounts than those indicated may, of course, be employed, especially when the said ester is relied on to provide an unusual amount of plasticity. The preferred and most practical amounts of these esters for the protection and modification of these polymers are from 2 to 9 per cent.

Among the polymers or copolymers which have been treated advantageously with the diesters of 7-oxabicyclo-(2,2,1)-5-heptene 2,3-dicarboxylic anhydride in accordance with the present invention are polyvinylidene chloride, polyvinyl chloride, and copolymers of vinylidene chloride and vinyl chloride.

The light stabilizing esters of the present invention may be incorporated with the polymer or copolymer by any of several methods, e. g. by grinding the materials in a ball mill or by compounding them on hot rolls in a manner similar to compounding rubber compositions.

Regardless of the means whereby the stabilizing modifiers are incorporated with the polymers or copolymers, a marked stabilizing effect is obtained when the mixture is exposed to light. Thus, a film or filament prepared from a polymeric vinylidene chloride, a polymeric vinyl chloride, or a copolymer of vinylidene chloride and vinyl chloride which does not contain a stabilizing agent may assume a dark brown or black coloration after several days' exposure to sunlight. In contrast, analogous articles comprising small amounts of the stabilizing agents may be exposed to sunlight or to more concentrated ultraviolet rays for long periods without becoming materially discolored.

The following examples illustrate the practice of the invention:

EXAMPLE 1

A copolymer of about 85 per cent vinylidene chloride and 15 per cent vinyl chloride, in powder form, was compounded with 1 per cent by weight, based on the copolymer, of tetrasodium pyrophosphate. This mixture was further compounded with a blended mixture containing 2 per cent by weight, based on the copolymer, of 2-hydroxy-5-chlorobenzophenone, and about 8 per cent by weight of one of the new stabilizing modifiers. These compositions were heated in an oven at 70° C. for 4 hours. They were again blended on rolls for 4 hours. The resulting compositions were heated in the chamber of an extrusion press to 180° C. and shaped by extrusion under pressure through a die having an orifice of about 0.012 inch in diameter. Test specimens of the filaments obtained were exposed to ultra-violet rays for 320 hours in a standard Fadeometer at a temperature of 60° C. and a relative humidity of 50 per cent. In all determinations, observations were made on test samples before, during, and after the exposure, the color change or darkening indicating the degree of deterioration resulting from the treatment. The degree of deterioration was evaluated by using an arbitrarily adopted numerical scale from 0 to 7, wherein 0 indicates no change has taken place in the appearance of the sample after exposure, and 7 indicates a nearly black sample. A blank, containing about the same amount of the same copolymer and the same proportions of tetrasodium pyrophosphate and 2-hydroxy-5-chlorobenzophenone but containing about 10 per cent of dibutyl phthalate instead of the esters of the present invention, was prepared and extruded under the same conditions as the other compositions.

The following Table I sets forth typical results obtained with filaments comprising representative members of the herein described class of diesters of 7-oxabicyclo (2,2,1)-5-heptene dicarboxylic anhydride.

Table I

| Light-Stabilizing Modifier | Exposure in Fadeometer | |
|---|---|---|
| | Before | After 320 Hours |
| Blank (dibutyl phthalate) | 0 | 6-7 |
| Di-n-propyl ester of present invention | 0 | 0-1 |
| Di-isobutyl ester of present invention | 0 | 3 |
| Di-nonyl ester of present invention | 0 | 1 |

EXAMPLE 2

A copolymer of about 25 per cent vinylidene chloride and 75 per cent vinyl chloride, in powder form, was compounded with the same proportions of tetrasodium pyrophosphate and 2-hydroxy-5-chlorobenzophenone but employing only 3 per cent by weight, based on the copolymer, of one of the new stabilizing modifiers. These compositions were extruded under the same conditions as those in Example 1. Similarly, a blank of the high vinyl chloride copolymer was prepared and extruded as in Example 1, but using only 3 per cent of dibutyl phthalate in place of the new esters. The results are given in Table II.

Table II

| Light-Stabilizing Modifier | Exposure in Fadeometer | |
|---|---|---|
| | Before | After 320 Hours |
| Blank (dibutyl phthalate) | 0 | 4 |
| Di-n-propyl ester of present invention | 0 | 1−1[1] |
| Di-nonyl ester of present invention | 0 | 0 |

[1] A value of −1 is used here to indicate that the sample appeared lighter in color after the 320-hour Fadeometer exposure than before.

The invention has been illustrated with particular reference to high vinylidene chloride and high vinyl chloride copolymers. It is to be understood, however, that the invention is not limited in its application to copolymers of vinylidene chloride and vinyl chloride in such proportion but is broadly concerned with compositions of polyvinylidene chloride, polyvinyl chloride, copolymers of vinylidene chloride and vinyl chloride and likewise with other copolymers containing significant amounts (10 per cent or more) of either vinylidene chloride or vinyl chloride.

Some of the representative members of the herein described class of esters were prepared by reacting about 2 moles of the desired alcohol (propyl, isobutyl, or nonyl alcohol) with about 1 mole of furan-maleic anhydride adduct in about 4 moles of methyl-cyclohexane and about 0.03 mole of p-toluene-sulfonic acid. These were refluxed for 1 to 2 hours at about 100° C. The vapor mixture, consisting of an azeotrope of methyl-cyclohexane, excess alcohol and water was condensed and removed from the system. The water layer was separated therefrom and the residual solvent layer returned to the boiling reaction mixture, all in one continuous operation. The progress of the reaction was indicated by the amount of water collected during esterification. When esterification was complete, the methyl-cyclohexane and excess alcohol were boiled off. The residual ester was washed with dilute alkali and was flash distilled under reduced pressure. Some of the representative members of the herein described class of esters have the following physical properties:

| Esters | Boiling Point | Specific Gravity at 25/25° C. |
|---|---|---|
| Di-n-propyl ester | 100° C. at 2 mm | 1.022 |
| Di-isobutyl ester | 120° C. at 1.5 mm | 0.981 |
| Di-nonyl ester | 185° C. at 1.5 mm | 0.937 |

We claim:

1. A composition of matter comprising a polymeric product containing at least 10 per cent of a material selected from the group consisting of vinylidene chloride and vinyl chloride in the polymer molecule, and, as a stabilizing agent therefor, from 0.5 per cent, based on the weight of said polymer, up to and including plasticizing quantities, of a dialkyl ester of 7-oxabicyclo (2,2,1) - 5 - heptene 2,3 - dicarboxylic anhydride, wherein the alkyl group contains from 1 to 12 carbon atoms.

2. The composition as claimed in claim 1 wherein the ester is the di-propyl ester of said anhydride.

3. The composition as claimed in claim 1 wherein the ester is the di-isobutyl ester of said anhydride.

4. The composition as claimed in claim 1 wherein the ester is the di-nonyl ester of said anhydride.

5. The composition as claimed in claim 1 wherein the polymeric product is composed mainly of vinylidene chloride.

6. The composition as claimed in claim 1 wherein the polymeric product is composed mainly of vinyl chloride.

7. The composition as claimed in claim 1 wherein the polymeric product is a copolymer of vinylidene chloride and vinyl chloride.

GERALD M. CORBETT.
NELSON W. ABERNETHY.

No references cited.